(12) United States Patent
Kinomura et al.

(10) Patent No.: US 6,748,936 B2
(45) Date of Patent: Jun. 15, 2004

(54) EXHAUST GAS RECIRCULATION CONTROL FOR INTERNAL COMBUSTION ENGINE AND METHOD OF EXHAUST GAS RECIRCULATION CONTROL

(75) Inventors: Shigeki Kinomura, Susono (JP); Kazuhisa Mogi, Susono (JP); Hirofumi Kubota, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/417,183

(22) Filed: Apr. 17, 2003

(65) Prior Publication Data
US 2003/0209234 A1 Nov. 13, 2003

(30) Foreign Application Priority Data
May 9, 2002 (JP) ........................................ 2002-133457

(51) Int. Cl.$^7$ ............................. F02M 25/07; F02P 5/15
(52) U.S. Cl. ............................. 123/568.22; 123/406.29; 123/568.14
(58) Field of Search .................. 123/568.11, 568.13, 123/568.14, 568.2, 568.21, 568.22, 568.23, 568.24, 568.25, 568.26, 568.27, 568.28, 90.15, 90.16, 90.17, 90.18, 406.29, 406.33; 701/108, 110, 111; 60/605.2

(56) References Cited

U.S. PATENT DOCUMENTS

| 5,203,311 | A  |   | 4/1993  | Hitomi et al.    | 123/568.12 |
| 6,257,213 | B1 | * | 7/2001  | Maeda            | 123/568.14 |
| 6,325,043 | B1 | * | 12/2001 | Meistrick et al. | 123/568.14 |
| 6,328,007 | B1 | * | 12/2001 | Hirasawa et al.  | 123/568.14 |
| 6,609,493 | B2 | * | 8/2003  | Yamaguchi et al. | 123/568.14 |
| 6,626,164 | B2 | * | 9/2003  | Hitomi et al.    | 123/568.14 |

* cited by examiner

Primary Examiner—Willis R. Wolfe
(74) Attorney, Agent, or Firm—Oliff & Berridge, PLC

(57) ABSTRACT

An internal combustion engine is provided with a VVT mechanism capable of adjusting overlap period in which both intake and exhaust valves are open. The internal combustion engine is also provided with a recirculation mechanism that recirculates exhaust gas to the intake side. An EGR map from which internal EGR amount based on the VVT mechanism and external EGR amount based on the recirculation mechanism are derived in accordance with engine speed and engine torque is prepared. The EGR map is realized as a four-dimensional map that also takes engine intake air temperature and engine coolant temperature into account. By performing EGR control in consideration of these parameters, the occurrence of knocking during EGR control can be suppressed, and an improvement in fuel consumption and the like can be achieved with certainty.

44 Claims, 11 Drawing Sheets

EXHAUST GAS RECIRCULATION CONTROL FOR INTERNAL COMBUSTION ENGINE AND METHOD OF EXHAUST GAS RECIRCULATION CONTROL

INCORPORATION BY REFERENCE

The disclosure of Japanese Patent Application No. 2002-133457 filed on May 9, 2002, including the specification, drawings, and abstract is incorporated herein by reference in its entirety.

BACKGROUND OF THE INVENTION

1. Field of the Invention

The invention relates to control of exhaust gas recirculation in an internal combustion engine.

2. Description of the Related Art

In internal combustion engines typified by gasoline engines, various arts are utilized to reduce amounts of emission substances and improve fuel consumption. Variable valve timing is one of such arts. Variable valve timing is an art in which overlap period in which both intake and exhaust valves of an internal combustion engine are open is changed by adjusting timings for opening and closing the intake valves. In general, an increase in overlap period makes it possible to reduce amounts of emission substances and improve fuel consumption. This is grounded on the fact that combustion gas is burned again after having been temporarily blown back into an intake pipe and sucked again into cylinders, and the fact that HC contained in combustion gas are burnt again at this moment (this phenomenon is referred to as internal EGR). Variable valve timing is utilized for the purpose of enhancing volumetric efficiency of intake air and increasing output as well as reducing amounts of emission substances and improving fuel consumption.

External EGR is another art of reducing amounts of emission substances and improving fuel consumption. External EGR is an art in which part of exhaust gas of an internal combustion engine is recirculated to the intake side. HC contained in combustion gas are burnt again by carrying out external EGR, whereby it becomes possible to reduce amounts of emission properties and improve fuel consumption.

The temperature of exhaust gas to be recirculated in the case of external EGR is lower than the temperature of exhaust gas to be recirculated in the case of internal EGR, and thus makes it possible to lower temperatures in cylinders. Therefore, external EGR has an effect of inhibiting the occurrence of knocking during high-load operation. On the contrary, internal EGR makes it possible to inhibit temperatures in the cylinders from dropping. Therefore, internal EGR has an effect of stabilizing combustion even during low-load operation. From the standpoint described above, there is proposed an art in which external EGR and internal EGR are selectively utilized such that external EGR is carried out only in a range of high loads and that internal EGR is carried out in ranges of lower loads, according to control regulations that are determined in advance by engine speed and engine load (e.g., as disclosed in Japanese Patent Application Laid-Open No. 4-175449).

By performing control such that internal EGR and external EGR are selectively carried out according to the control regulations determined in advance, however, it is impossible to achieve with certainty a desired effect of improving fuel consumption. Namely, the originally intended effect of improving fuel consumption is not achieved in some cases, depending on environmental factors relevant to operation of the internal combustion engine, temperatures of the internal combustion engine, and the like. Further, detailed studies on control during a transition between internal EGR and external EGR have not been conducted yet. In some cases, therefore, torque fluctuations are caused during a transition between internal EGR and external EGR.

SUMMARY OF THE INVENTION

The invention has been made to solve the aforementioned problem. It is an object of the invention to achieve with certainty a reduction in amounts of emission substances and an improvement in fuel consumption by selectively carrying out two kinds of exhaust gas recirculation, that is, internal EGR and external EGR in an internal combustion engine. It is another object of the invention to suppress torque fluctuations during a transition between internal EGR and external EGR.

In order to solve at least part of the aforementioned problem, an operation of an internal combustion engine is controlled in a manner described below according to a first arrangement of the invention. The internal combustion engine to be controlled includes a variable valve timing mechanism (hereinafter referred to as "VVT") capable of adjusting overlap period during which both intake and exhaust valves are open, and a recirculation mechanism for recirculating part of exhaust gas to the intake side.

A control device detects operational state of the internal combustion engine, and controls internal EGR amount based on overlap and external EGR amount based on the recirculation mechanism on the basis of control regulations that are set in advance. Operational state of the internal combustion engine can be detected, for example, using parameters including engine speed, engine load, and the like. An increase in overlap makes it possible to increase internal EGR amount. By enhancing time density (hereinafter referred to as "open duty") in which the recirculation mechanism is open, it becomes possible to increase external EGR amount. Furthermore, if the occurrence of knocking is forecast or detected during this control, the control device modifies the control regulations so as to avoid knocking. In forecasting the occurrence of knocking, it is sufficient that a high possibility of the occurrence of knocking be forecast. Even if the occurrence of knocking is forecast, continuation of operation under a corresponding condition may not always cause the actual occurrence of knocking.

In a second arrangement of the invention, if the occurrence of knocking is detected, a period of delay may be reduced or eliminated. This makes it possible to control the VVT swiftly and to avoid knocking swiftly. In general, since knocking tends to occur when overlap amount is large, it is preferable to control the VVT so as to reduce overlap amount.

DETAILED DESCRIPTION OF PREFERRED EMBODIMENTS

The embodiments of the invention will be described in a sequence described below:

A. Arrangement of System;

B. EGR Control Processings;

B1. Switching Sequence in Case A;

B2. Switching Sequence in Case B;

B3. Switching Sequence in Case C;

B4. Switching Sequence in Case D; and

C. Second Embodiment.

A. Arrangement of System

Figure 1:
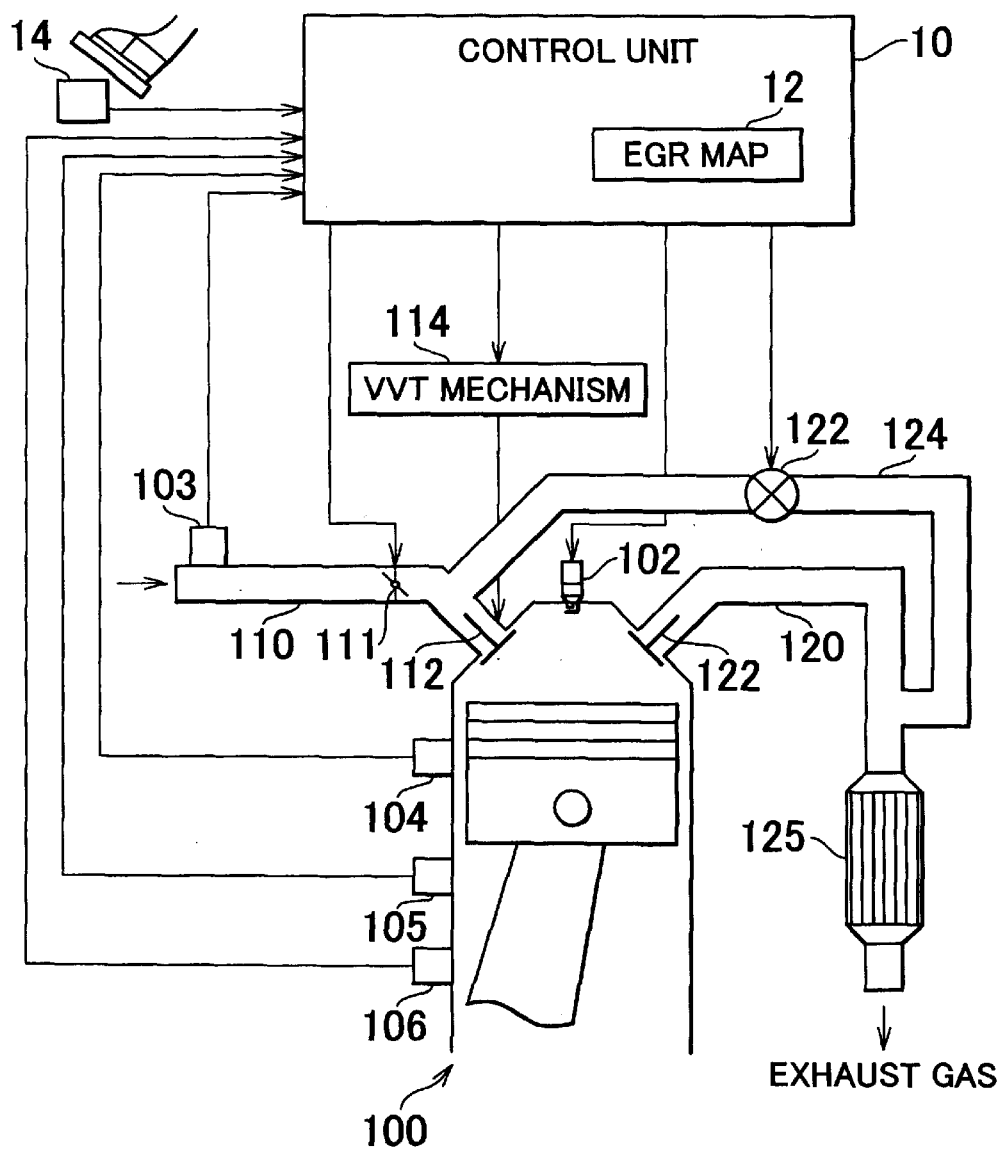
FIG. 1 is an explanatory view showing the arrangement of an internal combustion engine as an embodiment of the invention.

FIG. 1 is an explanatory view showing the arrangement of an internal combustion engine as an embodiment of the invention. In FIG. 1, the arrangement of a gasoline engine 100 installed in a vehicle is illustrated.

In the engine 100, the mixture of gasoline and air is sucked from an intake pipe 110 and is ignited and burnt by means of an ignition plug 102, and power is output in a cycle in which exhaust gas is discharged from an exhaust pipe 120. The intake pipe 110 is provided with a throttle 111 for adjusting amount of the mixture. A mechanism for injecting fuel is not shown. The exhaust pipe 120 is provided with a catalyst 125 for removing noxious components from exhaust gas.

A stroke in which the mixture is sucked into the engine 100 and a stroke in which exhaust gas is discharged from the engine 100 are interchanged depending on open-close states of intake and exhaust valves 112, 122. The intake valve 112 is provided with the VVT mechanism 114 for adjusting timings for opening and closing the intake valve 112. Because the arrangement of the VVT mechanism 114 is known, detailed description thereof is omitted. As an example of the VVT mechanism 114, a mechanism in which a cam coupled to the intake valve 112 and a crank shaft are changed in phase through hydraulic pressures. The exhaust valve 122 opens or closes at a certain timing with respect to rotation of the crank shaft. As will be described later, the VVT mechanism 114 is used to adjust internal EGR amount or to allow high torques to be output through enhancement of volumetric efficiency of cylinders.

The exhaust pipe 120 is provided with a recirculation mechanism for recirculating exhaust gas to the intake pipe 110. The recirculation mechanism has a recirculation line 121 connecting the exhaust pipe 120 to the intake pipe 110, and an EGR valve 122 for adjusting amount of exhaust gas recirculation (hereinafter referred to as "external EGR"). External EGR amount is controlled by adjusting time density in which the EGR valve 122 is open, that is, by adjusting duty.

The operation of the engine 100 is controlled by a control unit 10. The control unit 10 is arranged as a microcomputer including a CPU, a ROM, and a RAM. Some signals that are input from or output to the control unit 10 so as to control the engine 100 are illustrated in FIG. 1. For example, the signals input to the control unit 10 include a signal from a sensor 14 for detecting accelerator position, a signal from a sensor 103 for detecting intake air temperature, a sensor 104 for detecting engine coolant temperature, a sensor 105 for detecting the occurrence of knocking, and a signal from a sensor 106 for detecting engine speed.

For example, the signals output from the control unit 10 include signals for controlling the throttle 111, the VVT mechanism 114, ignition timing, and opening of the EGR valve 122. Opening of the throttle 111 is controlled, for example, in accordance with accelerator position. Ignition timing is controlled in accordance with engine speed and depending on whether or not knocking has occurred. In this embodiment, control of retarding ignition timing (hereinafter referred to as "retardation control") is performed if the occurrence of knocking is detected.

The VVT mechanism 114 and the EGR valve 122 are controlled in accordance with parameters including engine speed, engine load, and the like. In this embodiment, the control unit 10 controls internal EGR amount based on the VVT mechanism 114 and external EGR amount based on the recirculation mechanism and thereby achieves a reduction in amount of emission substances, an improvement in fuel consumption, and the like. Control of internal EGR and control of external EGR are performed on the basis of the EGR map 12 that is prepared in advance in the control unit 10. The contents of the EGR map will be described later.

Figure 2:
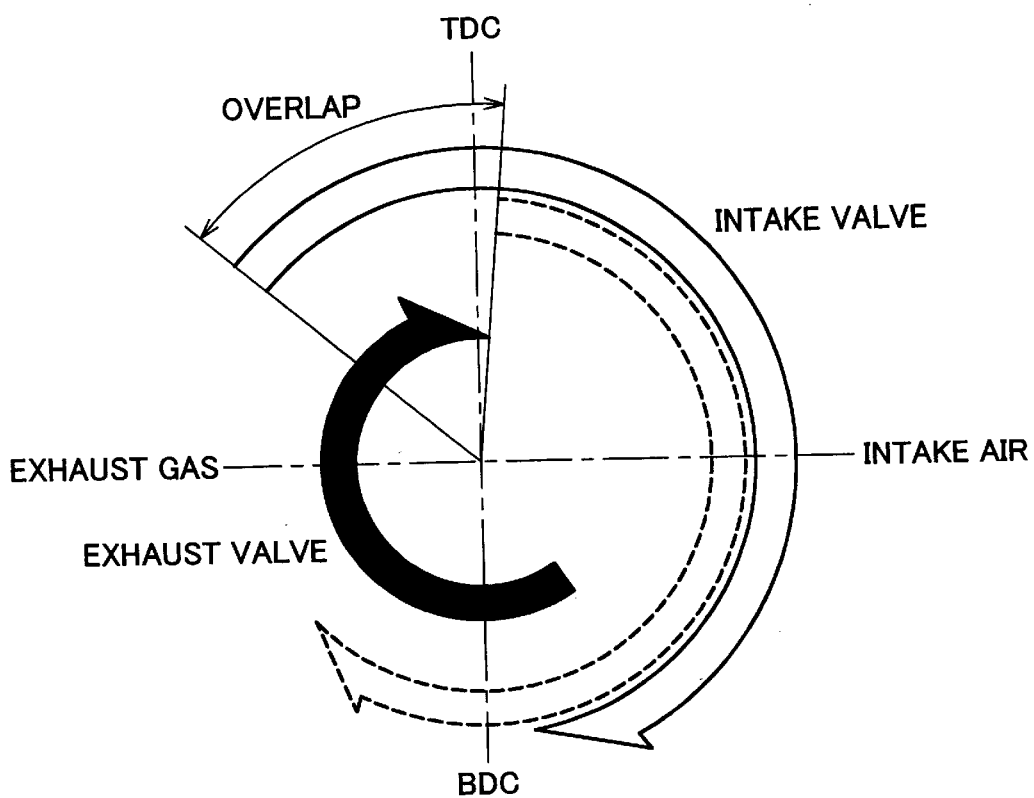
FIG. 2 is an explanatory view showing the operation of a VVT mechanism 114.

FIG. 2 is an explanatory view showing the operation of the VVT mechanism 114. FIG. 2 schematically shows a rotational state of the crank shaft. A right region ranging from a top dead center (TDC) and a bottom dead center (BDC) mainly corresponds to an intake stroke, and a left region ranging from the BDC to the TDC mainly corresponds to an exhaust stroke. In FIG. 2, a black-colored arrow indicates a period in which the exhaust valve is open, and an uncolored arrow and a dotted arrow indicate periods in which the intake valve is open. In this example, timings for opening and closing the exhaust valve are invariable, whereas timings for opening and closing the intake valves are variable. Advancing a timing when the intake valve starts opening as indicated by the uncolored arrow is referred to as advancement, and crank angle representing amount of change in advancement is referred to as advancement amount. Retarding a timing when the intake valve starts opening as indicated by the dotted arrow is referred to as retardation, and crank angle representing amount of change in retardation is referred to as retardation amount.

When the intake valve is retarded, overlap amount is small. When the intake valve is advanced, overlap amount is large. When overlap amount is large, combustion gas is likely to return to the intake pipe in an exhaust stroke. This causes an increase in internal EGR amount. In this embodiment, therefore, advancement control of the VVT mechanism 114 is appropriate for the purpose of increasing internal EGR amount. Advancement control achieves an effect of enhancing volumetric efficiency of the cylinders as well as an effect of increasing internal EGR amount. This is because the intake valve is closed early in the case of advancement as is apparent from FIG. 2. In outputting high torques, therefore, the advancement control of the VVT mechanism 114 is advantageous.

The timings when the intake and exhaust valves are opened and closed are shown in FIG. 2 merely as an example. The VVT mechanism 114 may be adapted such that timings for opening and closing the intake valve can be adjusted over a wider or narrower range than in the range shown in FIG. 2 or that timings for opening and closing the exhaust valve can be adjusted.

Figure 3:
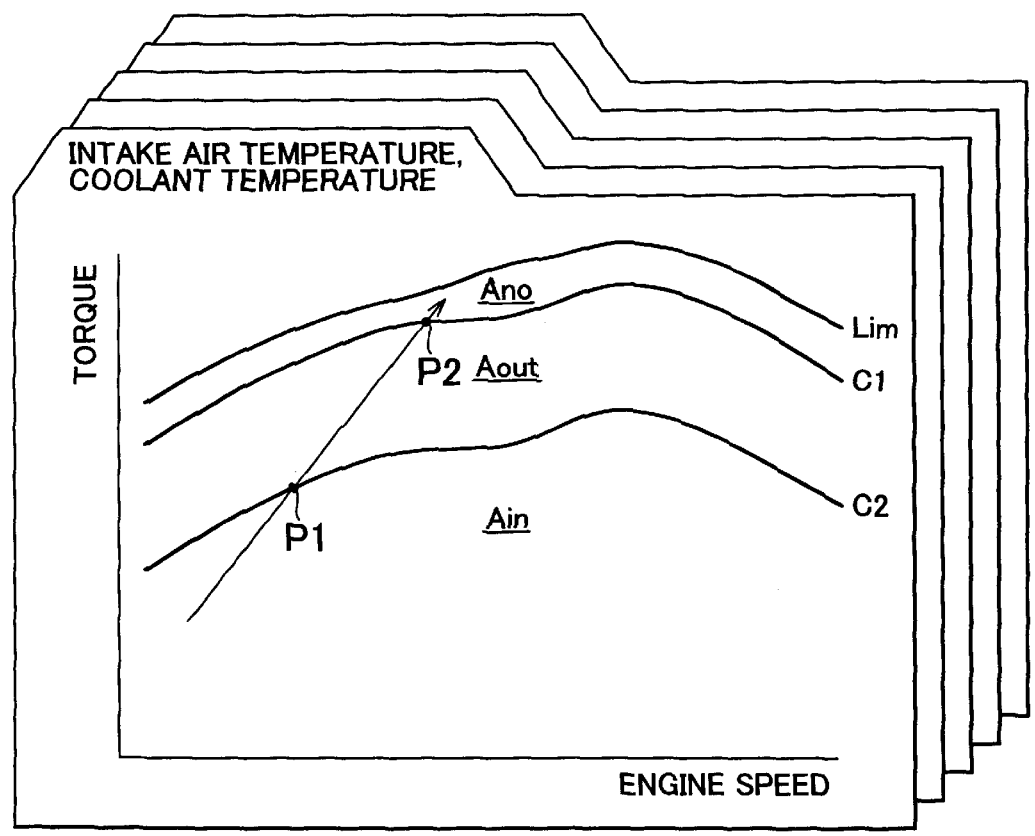
FIG. 3 is an explanatory view showing the outline of an EGR map 12.

FIG. 3 is an explanatory view showing the outline of the EGR map 12. Amounts of internal EGR and external EGR are derived from the map depending on operational states of the engine, that is, engine speed and engine torque. A curve Lim in FIG. 3 indicates the boundary of a range in which the engine is operable. A range stretching below the curve Lim is divided by curves C1, C2 into three ranges Ano, Aout, Ain. The range Ano is a range (hereinafter referred to as "high-torque range") in which neither internal EGR nor external EGR is carried out. The range Aout is a range (hereinafter referred to as "external EGR range") in which external EGR is mainly carried out. The range Ain is a range (hereinafter referred to as "internal EGR range") in which internal EGR is mainly carried out. In this embodiment, internal EGR amount is 0 in the external EGR range, and external EGR amount is 0 in the internal EGR range. It is also appropriate, however, that a predetermined internal EGR amount be used in the external EGR range, and that a predetermined external EGR amount be used in the internal EGR range. The EGR map 12 can be prepared in various forms including a table, a function, and the like.

As an example, consideration is given to a case where the operational state of the engine changes as indicated by an arrow in FIG. 3. At the outset, since the engine is operated in the range Ain, internal EGR is mainly carried out. In this range, the VVT mechanism 114 is controlled such that internal EGR amount is obtained in accordance with engine speed and engine torque. If the operational state of the engine reaches a point P1, the control unit 10 stops using internal EGR and starts using external EGR. Thus, the control unit 10 controls the VVT mechanism 114 toward the retardation side so as to realize a small amount of overlap, and increases duty of the EGR valve 122. If the operational state of the engine reaches a point P2, the control unit 10 closes the EGR valve 122 and stops using EGR. At the same time, the control unit 10 performs the advancement control of the VVT mechanism 114 so as to enhance volumetric efficiency of the cylinders. In this manner, the EGR map 12 is used to control the VVT mechanism 114 and the EGR valve 122 in accordance with operational state of the engine.

The EGR map 12 is prepared as a four-dimensional map in which engine coolant temperature and intake air temperature are used as parameters in addition to engine speed and engine torque. Engine coolant temperature is a parameter indicating warm-up states of the engine, and can be replaced with lubricating oil temperature, catalyst temperature, exhaust gas temperature, or the like. Intake air temperature is a parameter indicating environmental factors for operating the engine, and can be replaced with atmospheric pressure, humidity, or the like. As a matter of course, various parameters as mentioned above can be used in combination. It is also acceptable that the EGR map 12 be arranged as a three-dimensional map in which either the parameter indicating warm-up states of the engine or the parameter indicating environmental factors for operating the engine is used. Although amount of EGR is derived from the map in accordance with these parameters in this embodiment, it is also appropriate that correction coefficient for base EGR amount be derived from the map.

Figure 4:
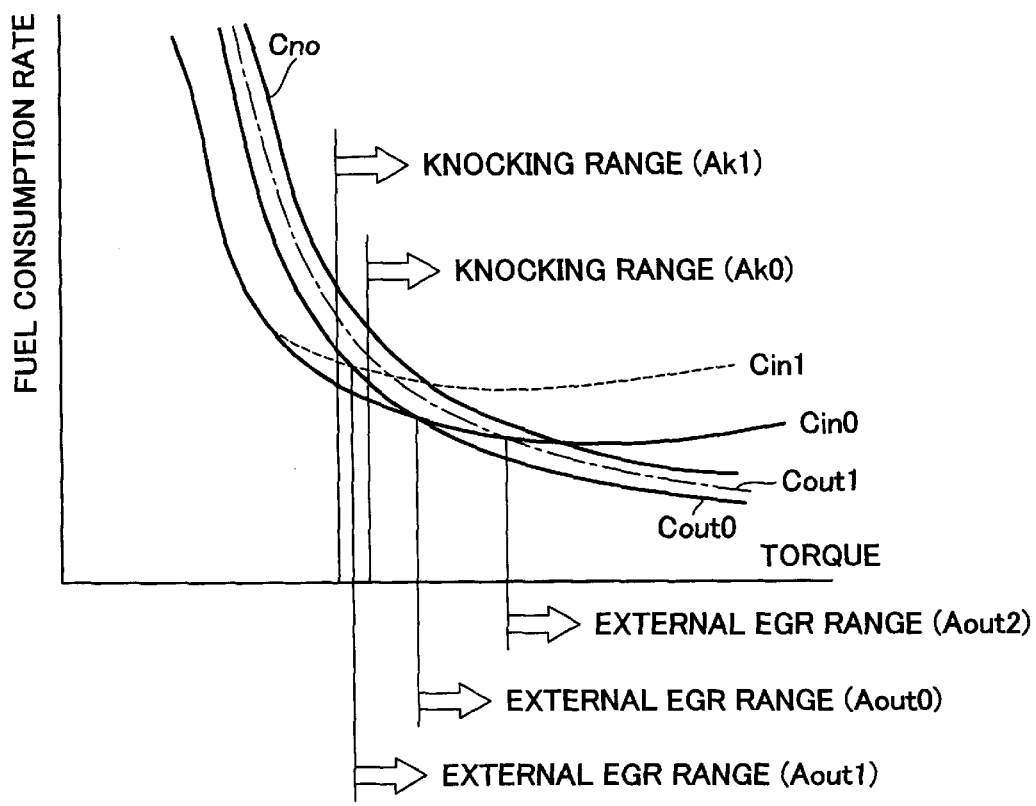
FIG. 4 is an explanatory view showing a method of setting the EGR map 12.

FIG. 4 is an explanatory view showing a method of setting the EGR map 12. FIG. 4 shows a relationship between torque and fuel consumption rate for a certain engine speed.

A curve Cno indicates a relationship between torque and fuel consumption rate in the case where EGR is not used. A curve Cin0 indicates a relationship between torque and fuel consumption rate in the case where internal EGR is carried out. A curve Cout0 indicates a relationship between torque and fuel consumption rate in the case where external EGR is carried out. As shown in FIG. 4, under conditions of a constant engine speed, fuel consumption rate generally decreases with increases in torque. This corresponds to a state in which so-called fuel consumption improves.

Focusing now on the curves Cin0, Cout0, fuel consumption rates indicated by the curve Cin0 are lower than those indicated by the Cout0 in a range of relatively low torques, whereas fuel consumption rates indicated by the curve Cout0 are lower than those indicated by the curve Cin0 in a range of relatively high torques. Namely, it is preferred from the standpoint of fuel consumption rate that a range stretching above a torque corresponding to an intersection of both the curves be set as the external EGR range Aout0. By plotting a graph as shown in FIG. 4 for each engine speed, a boundary line C2 between the internal and external EGR ranges shown in FIG. 3 can be set. Although not shown in FIG. 4, a boundary line C1 between the external EGR range and the high-torque range can also be set in a similar manner. It is appropriate that the boundary line C1 be set by plotting torques where fuel consumption rates indicated by the curve Cout0 are equal to those indicated by the curve Cno.

Curves indicating fuel consumption rate fluctuate depending on engine coolant temperature or intake air temperature. In the case of a high engine coolant temperature or a high intake air temperature, fuel consumption rate in the case where internal EGR is used deteriorates as indicated by a curve Cin1. Fuel consumption rate in the case where external EGR is used does not greatly fluctuate with respect to the curve Cout0. As a result, an external EGR range Aout1, which is determined by an intersection of the curves Cin1, Cout0, shifts toward the low-torque side.

Fluctuations observed in the curve Cin1 are regarded as relevant to a knocking range. The knocking range refers to an operational state in which an ignition timing when knocking starts is retarded with respect to an ignition timing (referred to as "MBT") when a maximum torque can be obtained. In the knocking range, since knocking occurs, ignition cannot be carried out at the MBT. Thus, the knocking range leads to an increase in fuel consumption rate at high torques. In general, knocking tends to occur with high engine temperatures or high intake air temperatures. In the case of a high engine coolant temperature and a high intake air temperature, therefore, a knocking range AK1 shifts toward the low-torque side. This leads to a deterioration in fuel consumption rates indicated by the curve Cin1. By thus setting the external EGR range in consideration of the knocking range, the EGR map 12 can prevent the occurrence of knocking.

On the other hand, in the case of a low engine coolant temperature and a low intake air temperature, use of external EGR leads to a further drop in combustion temperature and a deterioration in fuel consumption rate. Therefore, fuel consumption rate in the case where external EGR is carried out deteriorates as indicated by a curve Cout1. Fuel consumption rate in the case where internal EGR is used does not greatly fluctuate with respect to the curve Cin0. As a result, an external EGR range Aout2, which is determined by an intersection of the curves Cin0, Cout1 shifts to the high-torque side.

As described above, the boundary between the internal and external EGR ranges can be so set as to improve fuel consumption rate, in accordance with parameters including engine speed, torque, and the like. Although both engine coolant temperature and intake air temperature are taken into account in this embodiment, it is also appropriate that only one of them be taken into account. In general, the external EGR range shifts toward the low-torque side as the occurrence of knocking becomes more likely. The external EGR range shifts toward the high-torque side with drops in engine temperature.

B. EGR Control Processings

Figure 5:
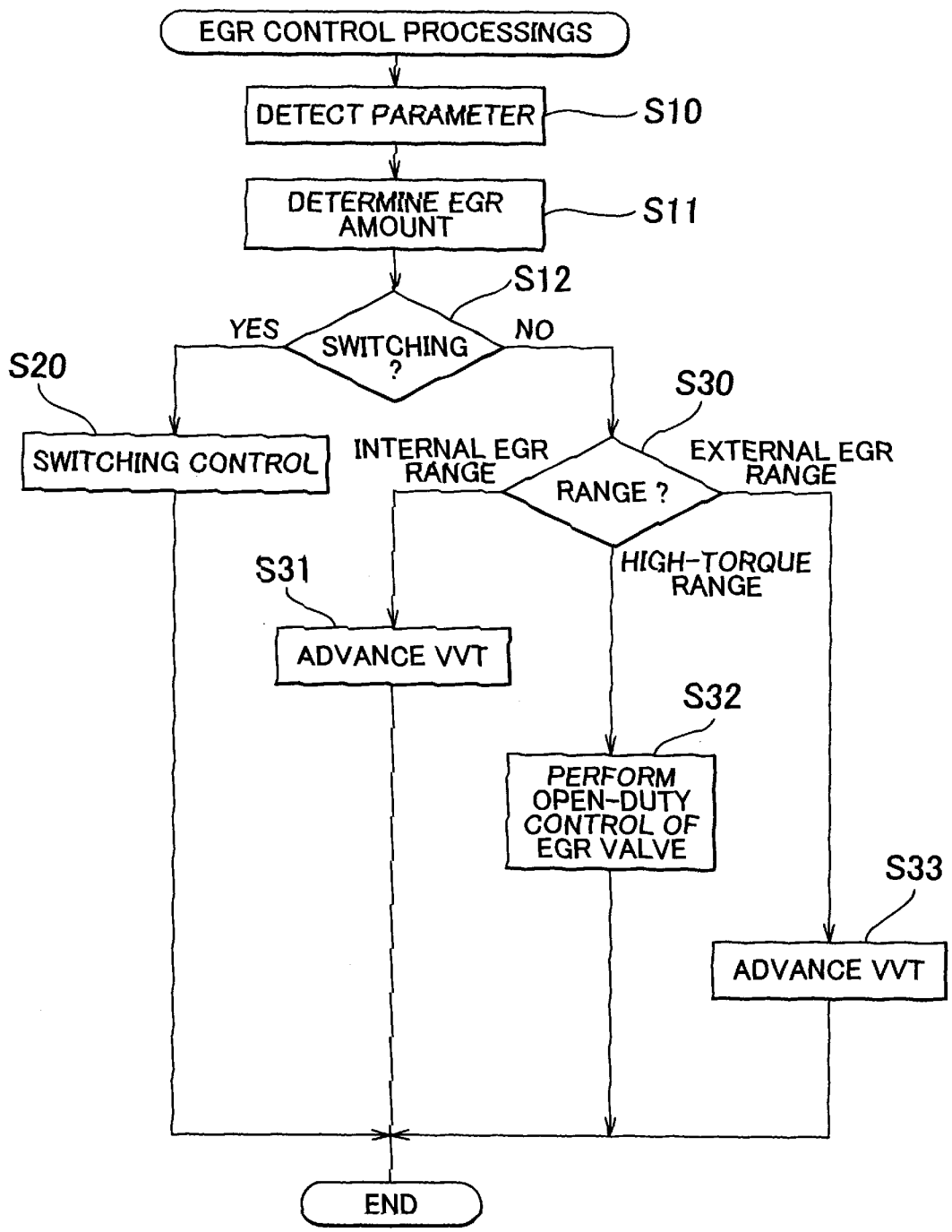
FIG. 5 is a flowchart of EGR control processings.

FIG. 5 is a flowchart of EGR control processings. These processings are repeatedly performed by the control unit 10 while the engine is in operation.

At the beginning of the processings, various parameters required for control are input to the control unit 10 (step S10). In this embodiment, the parameters for referring to the EGR map 12, that is, engine speed, engine torque, engine coolant temperature, and intake air temperature are input to the control unit 10.

The control unit 10 then sets an EGR amount by referring to the EGR map 12 (step S11). In this embodiment, after it has been determined in which one of the ranges shown in FIG. 3, that is, the internal EGR range, the external EGR range, and the high-torque range the engine is to be operated, an EGR amount in each of the ranges is set.

If the range set herein is different from a previous range (step S12), the control unit 10 performs switching control so as to switch the range (step S20). The processing contents of this control will be described later.

If there is no need to switch the range, the control unit 10 performs control of EGR amount in each of the ranges. If the engine is operated in the internal EGR region, the control unit 10 controls an amount of advancement of the VVT mechanism 114 so as to obtain an internal EGR amount that has been set (steps S30, S31). If the engine is operated in the external EGR range, the control unit 10 controls duty of the EGR valve 122 so as to obtain an external EGR amount that has been set (steps S30, S32). If the engine is operated in the high-torque range, the control unit 10 performs control such that a most advanced angle is obtained in the VVT mechanism 114, so as to enhance volumetric efficiency (steps S30, S33).

Figure 6:
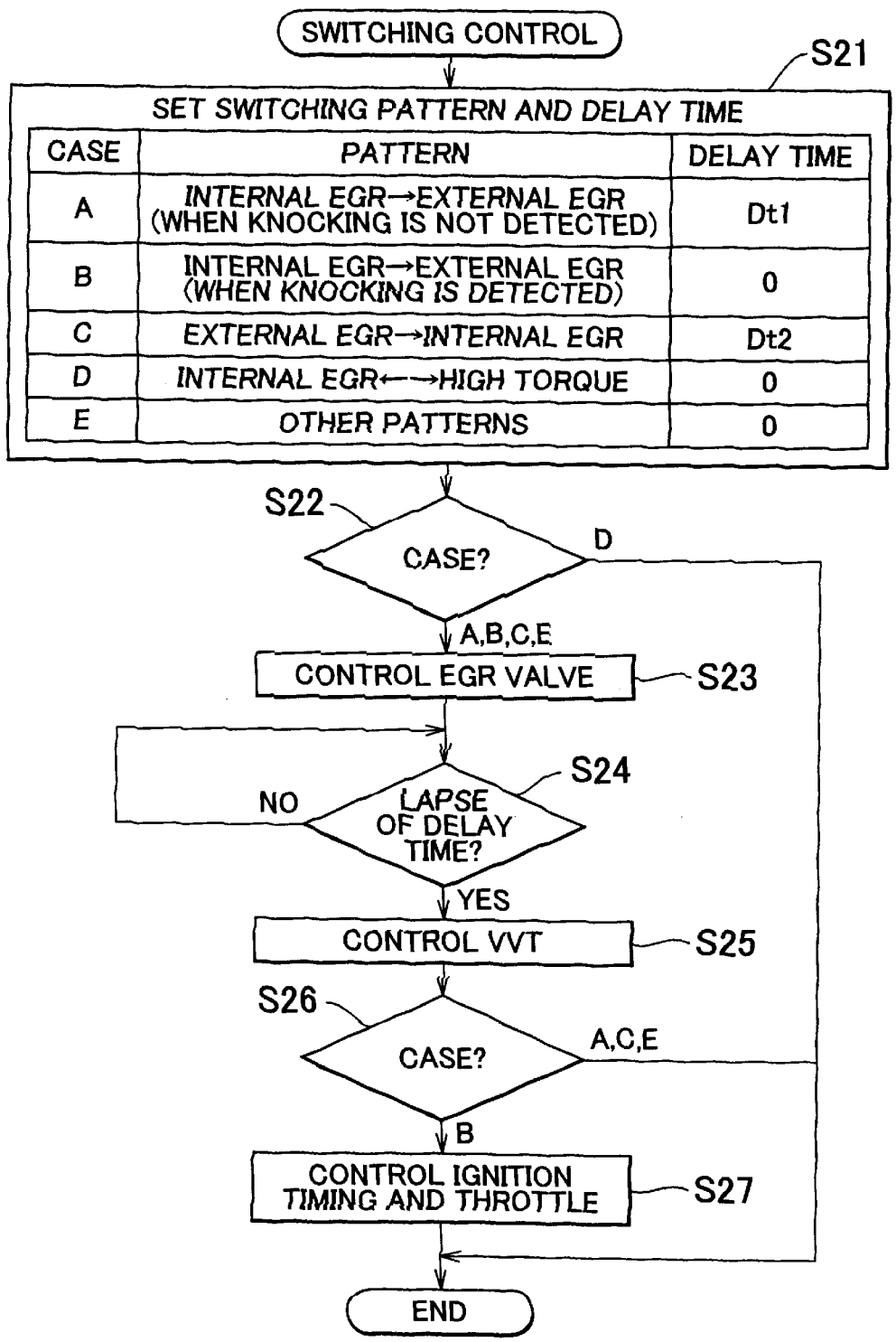
FIG. 6 is a flowchart of switching control processings.

FIG. 6 is a flowchart of switching control processings. These processings correspond to the processing in step S20 of FIG. 5. The control unit 10 sets a delay time in accordance with a switching pattern as described below (step S21). The delay time starts with control of the EGR valve 122 and ends with control of the VVT mechanism 114. A method of setting a delay time will be described later.

If knocking has not been detected when switching from the internal EGR range to the external EGR range (case A), the delay time is set equal to Dt1. If knocking has been detected (case B), the delay time is set equal to 0. When switching from the external EGR range to the internal EGR range (case C), the delay time is set equal to Dt2 whether knocking has been detected or not. When switching from the internal EGR range to the high-torque range (case D) or performing other switching operations (case E), the delay time is set equal to 0. The case D corresponds to a case where an accelerator is depressed during operation of the engine in the internal EGR range. It is possible to determine, on the basis of an accelerator opening, whether or not each case corresponds to the case D. Rate of change in accelerator opening may also be taken into account so as to determine whether or not the accelerator has been depressed all of a sudden.

The control unit 10 performs switching control depending on the cases (step S22). In the case D, according to the EGR map 12, a shift to the high-torque range is made after switching from the internal EGR range to the external EGR range. However, this processing is terminated without performing the switching operation. In this embodiment, the VVT mechanism 114 is advanced and the EGR valve is closed in both the internal EGR range and the high-torque range. By holding a state in the internal EGR range, therefore, an operational state in the high-torque range is realized without delay. In the case D, this control can be considered to prohibit a shift to the external EGR range or to substantially nullify the external EGR range. If the VVT mechanism 114 or the EGR valve 122 assumes different states between the internal EGR range and the high-torque range, it is acceptable to switch to the external EGR range as usual.

In the cases A to C and E, the control unit 10 controls the EGR valve 122 (step S23). When making a shift to the external EGR range, the control unit 10 increases a duty of the EGR valve 122. When making a shift from the external EGR range to other ranges, the control unit 10 reduces a duty of the EGR valve 122.

The control unit 10 then waits until a delay time elapses (step S24), and controls the VVT mechanism 114 (step S25). When making a shift to the internal EGR range or the high-torque range, advancement control of the VVT mechanism 114 is performed. When making a shift to the external EGR range, retardation control is performed. In the cases B, E, the delay time is 0. Thus, control of the VVT mechanism 114 is started without delay after control of the EGR valve 122 has been started.

If the VVT mechanism 114 is controlled, the switching control processings are terminated in the cases A, C, E (step S26). In the case B, ignition timing control and throttle control are further performed (steps S26, S27), and the switching control processings are terminated. In the case B, since knocking has been detected, ignition timing control or the like is performed so as to suppress torque fluctuations at the time of switching while preventing the occurrence of knocking. Control in step S27 is to be performed with this intention. Except in the case B, ignition timing control and throttle control are performed as usual in accordance with accelerator opening, engine speed, and the like.

B1. Switching Sequence in Case A

Figure 7:
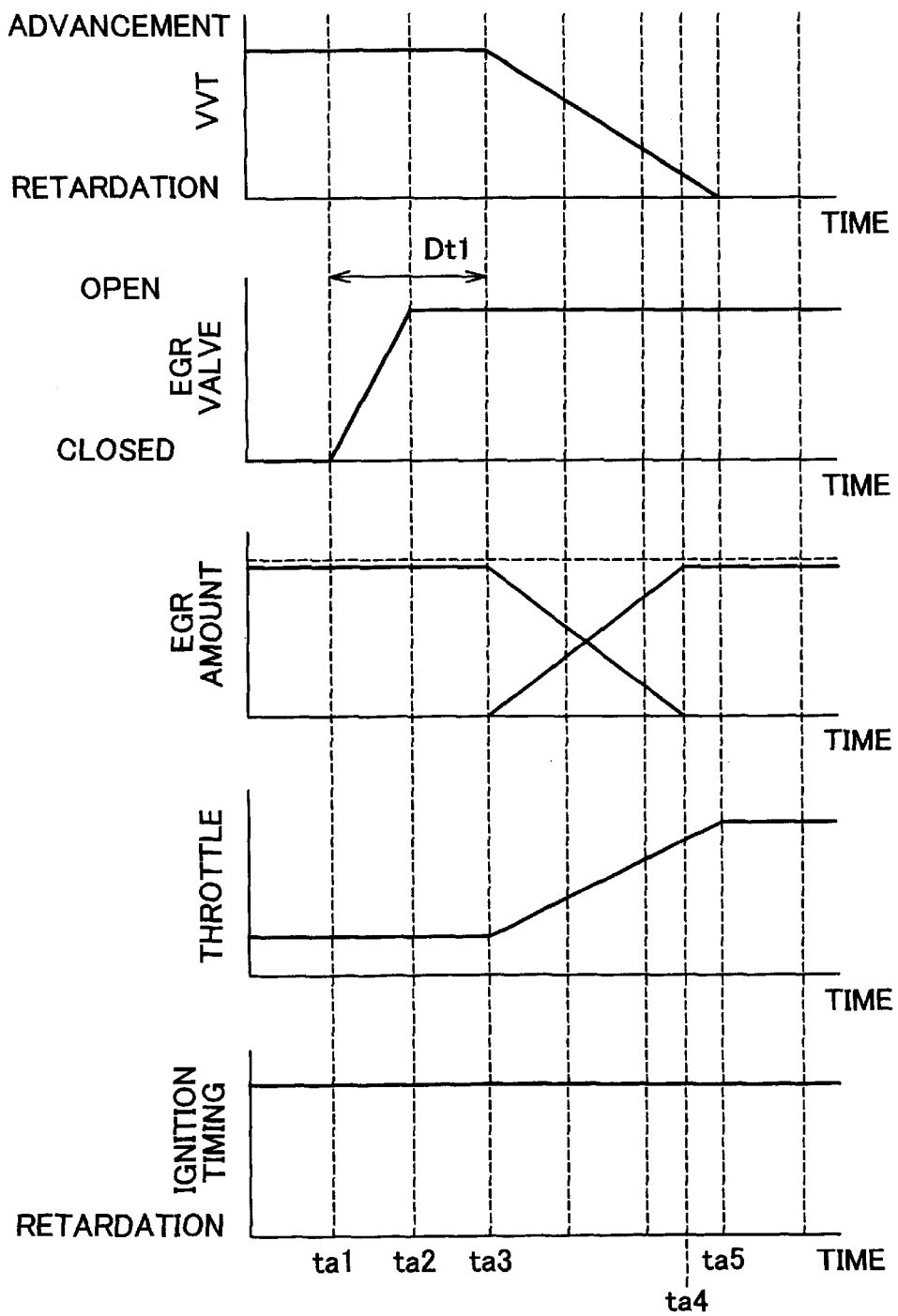
FIG. 7 is an explanatory view illustrating a switching sequence in a case A.

FIG. 7 is an explanatory view illustrating a switching sequence in the case A. This control corresponds to a case where knocking has not been detected when switching from the internal EGR range to the external EGR range. FIG. 7 illustrates how the state of the VVT mechanism, the state of the EGR valve, EGR amount, throttle opening, and ignition timing change with the lapse of time.

It is assumed that the accelerator is depressed at a timing ta1 and that the control unit 10 then determines that switching from the internal EGR range to the external EGR range is necessary. The control unit 10 initially increases a duty of the EGR valve from the timing ta1 to a timing ta2 and establishes an "open" state of the EGR valve. The control unit 10 starts increasing external EGR amount with a delay after the EGR valve 122 has been opened. In the example shown in FIG. 7, external EGR amount increases from a timing ta3 to a timing ta4.

The control unit 10 starts retardation control of the VVT mechanism 114 so as to reduce internal EGR amount in such a manner as to compensate for the increase in external EGR amount. Internal EGR amount follows operations of the VVT mechanism 114 without a considerable delay. In consideration of this property, the control unit 10 starts retardation control of the VVT mechanism 114 from the timing ta3 to a timing ta5. If the VVT mechanism 114 is controlled at this timing, internal EGR amount starts decreasing at the timing ta3. It is therefore possible to hold total EGR amount (indicated by a broken line in FIG. 7) as the sum of internal EGR amount and external EGR amount substantially constant. The delay time Dt1, which starts when control of the EGR valve 122 is started and which ends when control of the VVT mechanism 114 is started, is thus set so as to prevent sharp fluctuations in total EGR amount.

In the example shown in FIG. 7, control of the VVT mechanism 114 is started at the timing ta3 when external EGR amount starts increasing. It is not absolutely required, however, that control of the VVT mechanism 114 be started simultaneously with an increase in external EGR amount. From the standpoint of suppressing sharp fluctuations in total EGR amount, it is appropriate to adopt a method of detecting the supply of exhaust gas based on external EGR to the intake side by means of a sensor and setting a timing for opening the VVT mechanism 114 in synchronization with the supply of exhaust gas based on external EGR, instead of performing control so as to set the delay time Dt1 in advance.

During control in the case A, since total EGR amount is held substantially constant, ignition timing is held substantially constant. The throttle is controlled in accordance with depression stroke of the accelerator. In order to stabilize combustion of the engine, it is preferable that throttle opening be controlled in synchronization with the VVT mechanism 114.

B2. Switching Sequence in Case B

Figure 8:
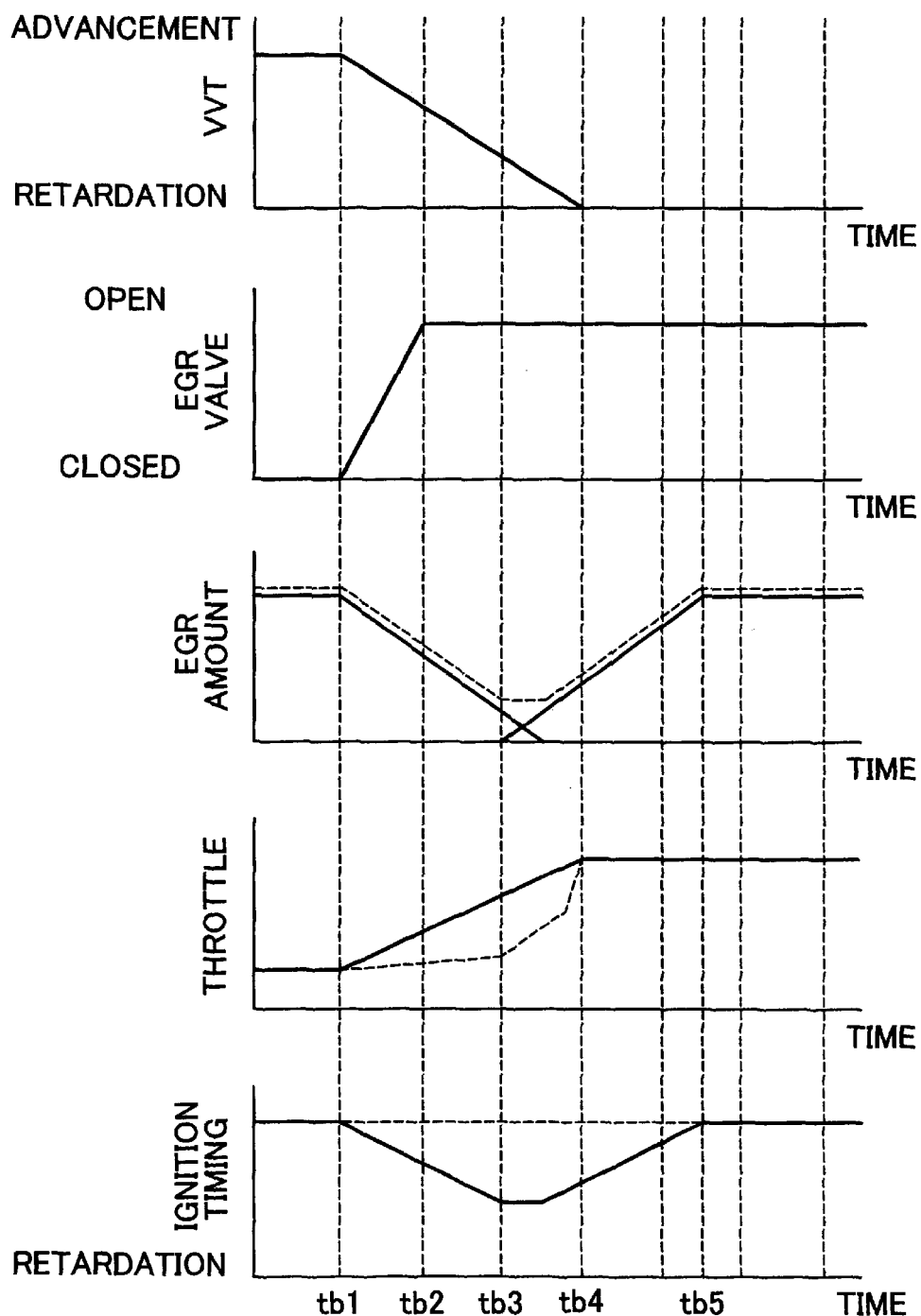
FIG. 8 is an explanatory view illustrating a switching sequence in a case B.

FIG. 8 is an explanatory view illustrating a switching sequence in the case B. This control corresponds to a case where knocking has been detected when switching from the internal EGR range to the external EGR range.

If the accelerator is depressed at a timing tb1 and if the control unit 10 determines that switching from the internal EGR range to the external EGR range is necessary, the control unit 10 establishes an "open" state of the EGR valve 122 from the timing tb1 to a timing tb2.

In the case B, since knocking has been detected, it is desirable to swiftly shift the atmosphere in the engine to a state in which knocking can be avoided. In general, a reduction in internal EGR amount and an increase in external EGR amount are preferred in an attempt to avoid knocking. In view of this, the delay time is set equal to 0, and the control unit 10 starts retardation control of the VVT mechanism 114 almost as soon as control of the EGR valve 122 is started (from the timing tb1 to a timing tb4).

In the case B, since retardation control of the VVT mechanism 114 is started early, the balance between a reduction in internal EGR amount and an increase in external EGR amount is upset. This causes a temporary reduction in total EGR amount from the timing tb1 to a timing tb5, as indicated by a broken line. Because the cylinders are constant in volume, a reduction in EGR amount leads to an increase in amount of fresh air introduced from the outside. In periods in which EGR amount decreases, therefore, an enhancement of combustion efficiency and an abrupt increase in torque are possible.

In the case B, both throttle control and ignition timing control are performed so as to suppress such torque fluctuations. It is also appropriate that the throttle be controlled in accordance with the VVT mechanism 114 and that retardation control of ignition timing be performed so as to suppress torque fluctuations (see solid lines in FIG. 8). It is also appropriate that ignition timing be held constant and that the throttle be narrowed down so as to suppress torque fluctuations (see broken lines in FIG. 8). These control modes may be combined with each other or may be selectively utilized depending on conditions. For example, retardation amount of ignition timing and narrowing-down amount of the throttle may be subjected to open-loop control on the basis of a map prepared in advance or may be subjected to feedback control so as to compensate for torque fluctuations.

In the case B, it is not absolutely required that the delay time be set equal to 0. The delay time can be arbitrarily set in such a manner as to prevent sharp torque fluctuations while avoiding knocking without delay, within a smaller range than the delay time Dt1 in the case (case A) where knocking has not been detected.

B3. Switching Sequence in Case C

Figure 9:
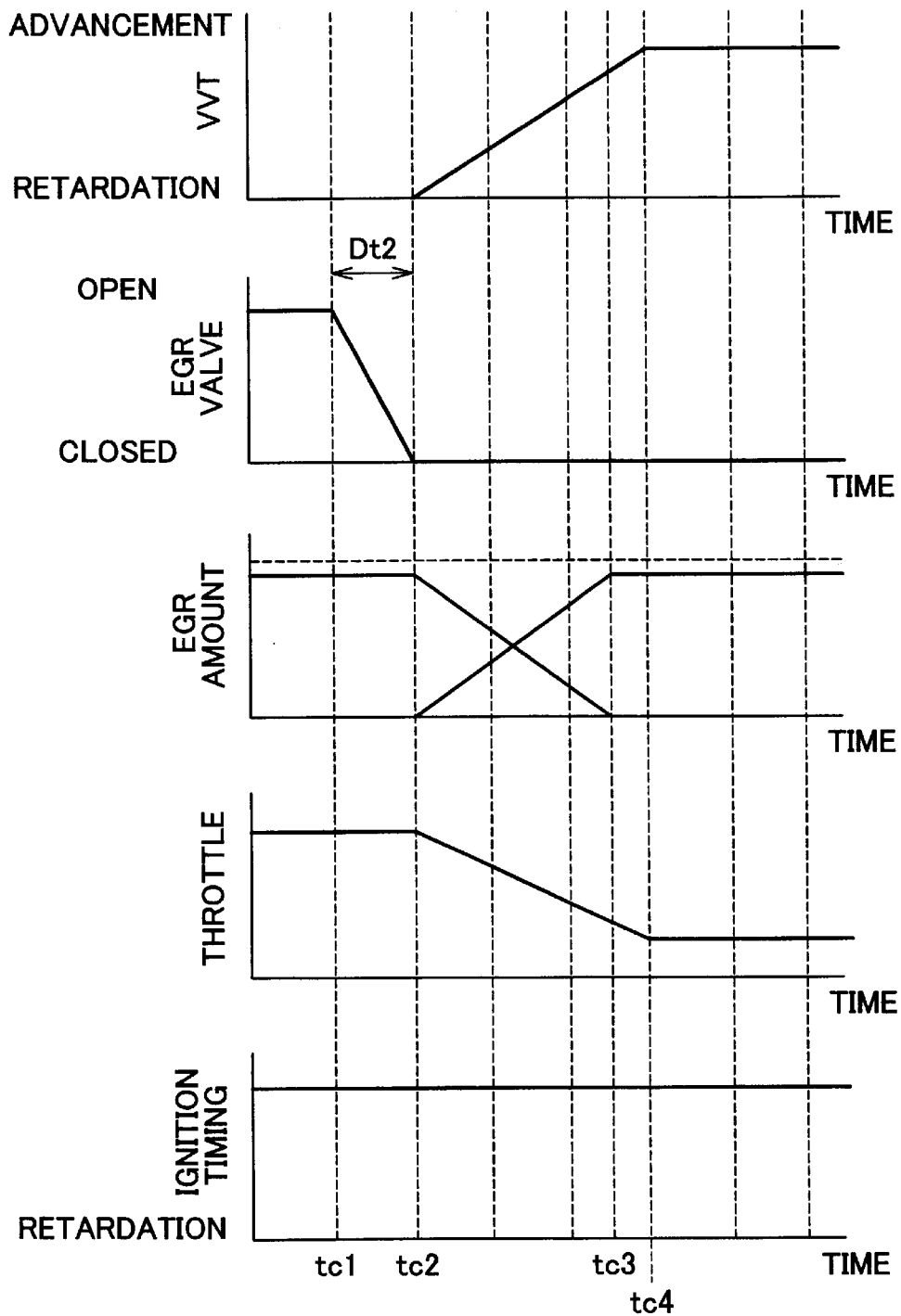
FIG. 9 is an explanatory view illustrating a switching sequence in a case C.

FIG. 9 is an explanatory view illustrating a switching sequence in the case C. This control is to be performed when switching from the external EGR range to the internal EGR range.

If the accelerator is slightly released at a timing tc1 and if the control unit 10 determines that switching from the external EGR range to the internal EGR range is necessary, the control unit 10 establishes a "closed" state of the EGR valve 122 from the timing tc1 to a timing tc2. External EGR amount starts decreasing with a delay from closure of the EGR valve 122. In the example shown in FIG. 9, external EGR amount decreases from the timing tc2 to a timing tc3.

The control unit 10 performs advancement control of the VVT mechanism 114 from the timing tc2 to a timing tc4 so as to compensate for a decrease in external EGR amount by increasing internal EGR amount. Because internal EGR amount starts increasing at the timing tc3, total EGR amount (indicated by a broken line in FIG. 9) as the sum of internal EGR amount and external EGR amount can be held substantially constant. The delay time Dt2, which starts when control of the EGR valve 122 is started and which ends when control of the VVT mechanism 114 is started, is thus set so as to prevent sharp fluctuations in total EGR amount.

In the example shown in FIG. 9, control of the VVT mechanism 114 is started at the timing ta2 when external EGR amount starts decreasing. It is not absolutely required, however, that control of the VVT mechanism 114 be started simultaneously with a decrease in external EGR amount. From the standpoint of suppressing sharp fluctuations in total EGR amount, it is appropriate to adopt a method of detecting a decrease in external EGR amount by means of a sensor and setting a timing for opening the VVT mechanism 114 in synchronization with the decrease in external EGR amount, instead of performing control so as to set the delay time Dt2 in advance.

During control in the case C, since total EGR amount is held substantially constant, ignition timing is held substantially constant. The throttle is controlled in accordance with depression stroke of the accelerator and in synchronization with the VVT mechanism 114.

B4. Switching Sequence in Case D

Figure 10:
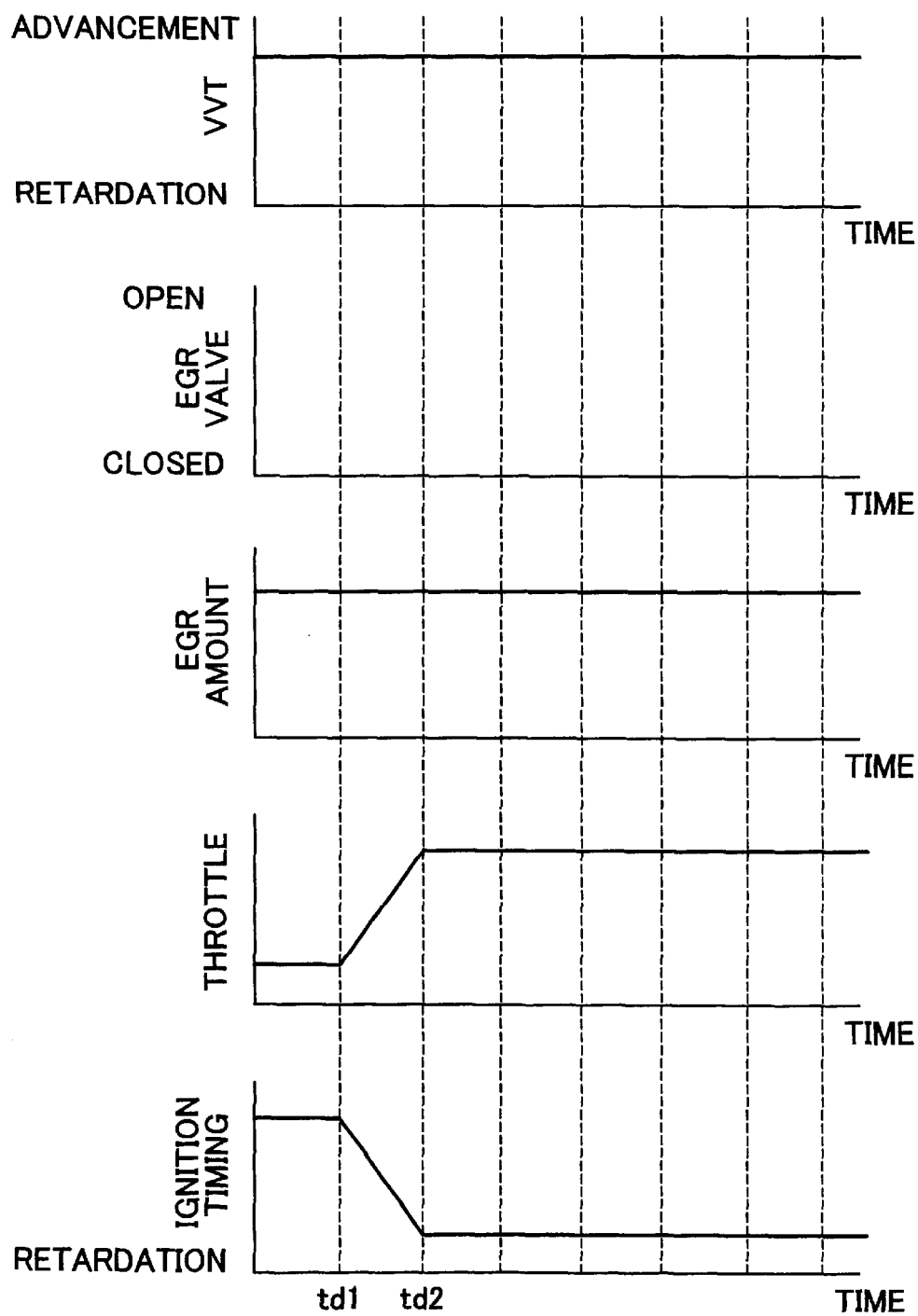
FIG. 10 is an explanatory view illustrating a switching sequence in the case C.

FIG. 10 is an explanatory view illustrating a switching sequence in the case D. This control is to be performed when switching from the internal EGR range to the high-torque range.

If the accelerator is depressed at a timing td1 and if the control unit 10 determines that switching from the internal EGR range to the high-torque range is necessary, the control unit 10 holds the throttle valve open from the timing td1 to a timing td2. In the high-torque range, the VVT mechanism 114 and the EGR valve 122 assume the same states as in the internal EGR range. Therefore, the VVT mechanism 114 and the EGR valve 122 are maintained in the states in the internal EGR range. Accordingly, EGR amount does not sharply fluctuate either. Ignition timing is subjected to retardation control in accordance with opening of the throttle valve, so as to suppress sharp torque fluctuations.

In the embodiment described above, internal EGR amount and external EGR amount can be controlled in consideration of the parameters representing warm-up states of the engine and environmental factors, in addition to engine speed and engine torque. In this control, it is possible to mitigate inconveniences resulting from the occurrence of knocking by using the EGR map 12, which is set so as to avoid knocking on the basis of warm-up states of the engine and environmental factors. Thus, EGR-based effects of reducing amounts of emission substances and improving fuel consumption can be achieved with certainty.

By thus modifying control regulations, it becomes possible to control internal EGR amount and external EGR amount while inhibiting the occurrence of knocking. In general, knocking leads to a drop in combustion efficiency of the internal combustion engine and power instability. By inhibiting the occurrence of knocking as described above, the invention makes it possible to reduce amounts of emission substances resulting from internal EGR and external EGR in each operational state of the engine, and to improve fuel consumption.

In general, if ignition timing is advanced in an internal combustion engine, knocking may be caused before the internal combustion engine reaches a maximum load that can be output. Engine speed and torque range where such knocking occurs are referred to as knocking limit and knocking range, respectively. Knocking limit is influenced by environmental factors relevant to operation of the internal combustion engine and temperature of the internal combustion engine. As described above, the gist of the invention consists in predicting or detecting the occurrence of knocking and modifying the control regulations. This is also synonymous with modifying the control regulations in accordance with fluctuation factors of knocking limit.

The control regulations can be modified in various modes. For example, the control regulations may be modified on the basis of predetermined parameters concerning the occurrence of knocking. As an example, it is possible to adopt a mode in which the likelihood of knocking is forecast and the control regulations are modified if each of these parameters is within a predetermined range. It is also appropriate that various control regulations be prepared in accordance with values of these parameters whether knocking actually occurs or not, and that the control regulations be selectively used in accordance with the parameters.

Parameters representing environmental factors relevant to operation of the internal combustion engine can be used to forecast the occurrence of knocking. For example, at least one of temperature, pressure, and humidity of air sucked into the internal combustion engine can be used. One of these parameters may be selected to be used separately. Alternatively, they may be used in combination. In general, the occurrence of knocking becomes more likely as air temperature or air pressure rises. In view of this fact, it is possible to adopt a mode in which the control regulations are modified if a predetermined value is exceeded. The occurrence of knocking becomes more likely as humidity drops. In view of this fact, it is possible to adopt a mode in which the control regulations are modified if a predetermined value is not reached or exceeded.

Temperature of the internal combustion engine may be used as a parameter. In this case, temperatures of various parts constituting the internal combustion engine and representing a warm-up state thereof can be used. For example, engine coolant temperature, cooling oil temperature, or the like is regarded as temperature of the internal combustion engine. In addition, it is also possible to use catalyst temperature, external EGR temperature, exhaust gas temperature, or the like.

For example, as a modification in the control regulations in the case where the occurrence of knocking is forecast, it is possible to shift a boundary between a range in which internal EGR is mainly carried out and a range in which external EGR is mainly carried out toward the low-torque side. By taking this measure, external EGR is used early in response to an increase in load. It is therefore possible to inhibit the occurrence of knocking and to achieve a reduction in amounts of emission substances and an improvement in fuel consumption.

In the invention, if knocking is detected during operation in the internal EGR range that is set such that internal EGR is mainly carried out according to the control regulations, the control regulations may be modified such that external EGR is mainly carried out. By taking this measure, the occurrence of knocking can be avoided with more certainty than in the case where the occurrence of knocking is forecast. It is sufficient that the control regulations be modified at least when the internal combustion engine assumes an operational state in which knocking is detected. For example, if fluctuations in operational state of the internal combustion engine arise, the control regulations may be modified again such that internal EGR is mainly carried out.

The scope of this modification of the control regulations may be limited to part of the internal EGR range. Namely, it is appropriate that a variable control regulation range that allows a switching operation to be performed such that external EGR is mainly carried out be provided within a certain range in the internal EGR range on the high-torque side, and that the control regulations be modified if knocking is detected during operation in the variable control regulation range. If the internal combustion engine assumes an operational range that is within the internal EGR range and outside the variable control regulation range, internal EGR is mainly carried out whether knocking has occurred or not. This mode means that a determination as to whether or not the control regulations are to be modified is made within the variable control regulation range. In practice, both a modification of the control regulations within the variable control regulation range and a modification of the control regulations outside the variable control regulation range are acceptable. For example, it is also possible to adopt a mode in which a modification of the control regulations is started as soon as a predetermined time elapses after the detection mentioned above.

This restriction of the range in which the control regulations can be modified confers an advantage in that the burden on detection of knocking can be reduced. This restriction confers another advantage in that internal EGR can be prevented from being switched to external EGR due to erroneous detection carried out outside the variable control regulation range.

The variable control regulation range can be set within the internal EGR range, for example, except those ranges in which the occurrence of knocking is considered to be unlikely even in consideration of various factors triggering fluctuations in knocking limit and those ranges in which use of external EGR is considered to be unfavorable from the standpoint of torque fluctuations.

Various control devices in accordance with the invention described above are especially useful in the case where control of retarding ignition timing of the internal combustion engine (hereinafter referred to as retardation control of ignition timing) is also performed when knocking occurs. Retardation control of ignition timing often leads to a reduction in output torque of the internal combustion engine and combustion instability. According to control of the invention, the frequency with which retardation control of ignition timing is performed can be reduced by inhibiting the occurrence of knocking.

As a second arrangement of the invention, a VVT is controlled with a delay from control of a recirculation mechanism in at least one of a transition from the internal EGR range to the external EGR range and a transition from the external EGR range to the internal EGR range. This control may be performed in combination with the control described above as a first arrangement of the invention. Alternatively, the control of the second arrangement may be performed separately.

In general, external EGR amount is not so good in responsive characteristic during control as internal EGR amount. For example, even if open duty of the recirculation mechanism is increased, there arises a time delay corresponding to passage of the recirculation mechanism until external EGR amount increases. Even if open duty of the recirculation mechanism is reduced, exhaust gas in the recirculation mechanism is recirculated for a while. Therefore, there arises a time delay until EGR amount decreases. Thus, EGR amount can be adapted to a target value by controlling the recirculation mechanism before controlling the VVT. The delay time starting with control of the recirculation mechanism and ending with control of the VVT may be constant. Alternatively, the delay time may be varied in accordance with speed, load, or the like of the internal combustion engine.

It is preferable to set the delay time such that the total amount of exhaust gas recirculated into the internal combustion engine becomes constant. By taking this measure, it becomes possible to suppress sharp torque fluctuations at the time of transition.

C. Second Embodiment

In the first embodiment, inconveniences resulting from knocking during EGR control are eliminated by using the map that is set in advance so as to make it possible to avoid knocking with warm-up states, environmental factors, and the like of the engine being used as parameters. This corresponds to the mode in which the control regulations for EGR are modified so as to avoid knocking if the occurrence of knocking is forecast on the basis of the parameters. According to a mode illustrated in the second embodiment, it is determined whether or not knocking occurs, and the control regulations are modified so as to avoid knocking as soon as knocking is detected.

The system of the second embodiment is identical in arrangement with the system of the first embodiment. In the second embodiment, the contents of the EGR map used for control of EGR amount are different from those of the first embodiment.

Figure 11:
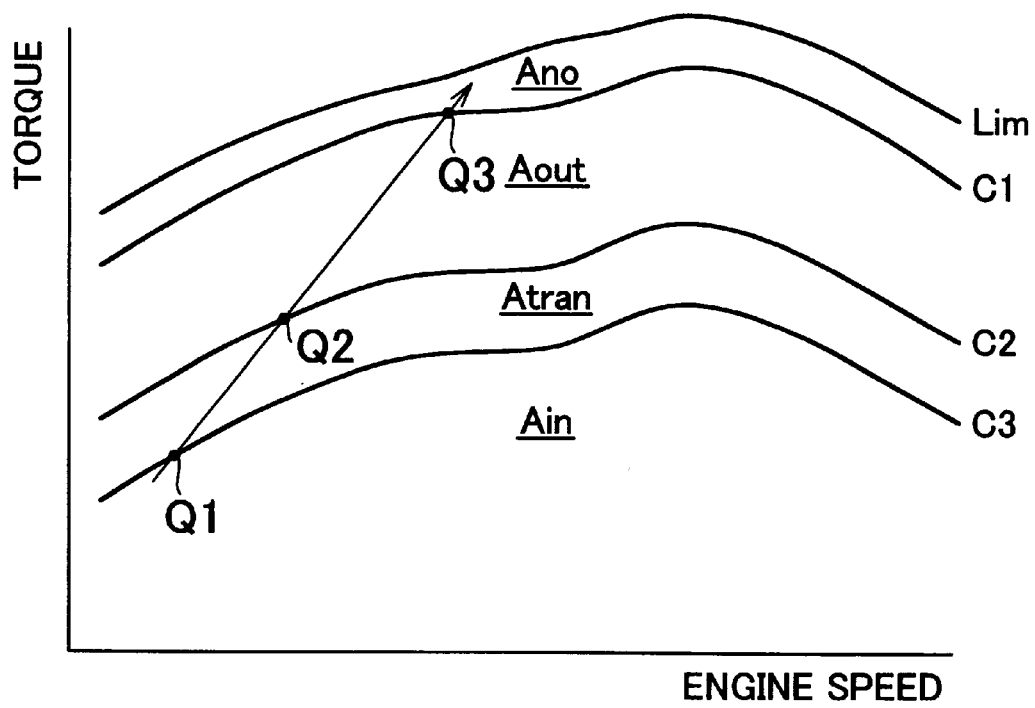
FIG. 11 is an explanatory view illustrating an EGR map in accordance with a second embodiment of the invention.

FIG. 11 is an explanatory view illustrating the EGR map in accordance with the second embodiment of the invention.

The internal EGR range of the first embodiment is further divided by a curve C3 into two ranges. A range Ain is the internal EGR range in which internal EGR is mainly carried out. A transitional range Atran is intended for a transition from the internal EGR range to the external EGR range. Although internal EGR is mainly carried out in the range Atran, internal EGR is switched to external EGR upon detection of knocking.

The internal EGR range Ain can be set, for example, as a range in which the occurrence of knocking is considered to be impossible even in consideration of warm-up states and environmental factors of the engine. From the standpoint of preventing sharp torque fluctuations, the internal EGR range Ain may be set as a range in which switching to external EGR is to be prohibited even if knocking has occurred. It is also appropriate that the internal EGR range Ain be dispensed with and that the transitional range Atran be set as the entire range stretching below a curve C2.

As an example, consideration is given to a case where the operational state of the engine changes as indicated by an arrow in FIG. 11. At the outset, since the engine is operated in the range Ain, internal EGR is mainly carried out. In this range, even if knocking has occurred, an attempt to avoid knocking is made by retardation control of ignition timing or the like while internal EGR is carried out. After the operational state has reached a point Q1, the control unit 10 continues to carry out internal EGR in the transitional range stretching to a point Q2. Upon detection of knocking, however, the control unit 10 switches to external EGR. If the operational state reaches the point Q2 with knocking being undetected, the control unit 10 stops carrying out internal EGR and switches to external EGR whether knocking has occurred or not. In addition, if the operational state reaches a point Q3, the control unit 10 closes the EGR valve 122, stops carrying out EGR, and performs advancement control of the VVT mechanism 114 so as to enhance volumetric efficiency of the cylinders.

In the second embodiment, the EGR map is prepared as a two-dimensional map or function corresponding to engine speed and engine torque. Thus, storage capacity of the EGR map can be reduced, and the burden on processings performed by the CPU in referring to the map is alleviated. As a matter of course, the EGR map may be prepared as a three-dimensional or multi-dimensional map or function that also takes one or more parameters such as engine coolant temperature and intake air temperature into account.

The EGR control processings of the second embodiment are identical with those of the first embodiment (FIG. 5). Namely, after detecting an engine speed and an engine torque as parameters (step S10) and determining an EGR amount (step S11), the control unit 10 makes a determination on switching of the ranges (step S12). At this moment, the presence of knocking is taken into account as opposed to the first embodiment. If knocking is detected in the transitional range, the control unit 10 determines that switching to external EGR is necessary. If knocking is not detected in the transitional range, the control unit 10 determines that switching to external EGR is unnecessary. After making this determination, the control unit 10 performs the same switching control as in the first embodiment (step S20) and control for each of the ranges (steps S30 to S32), and terminates the EGR control processings.

According to the control of the second embodiment described above, switching to external EGR is possible as soon as knocking is detected. It is therefore possible to mitigate inconveniences resulting from the occurrence of knocking. Thus, EGR-based effects of reducing amounts of emission substances and improving fuel consumption can be achieved with certainty. In the second embodiment, the control unit 10 determines whether or not knocking has actually occurred, instead of forecasting the occurrence of knocking. For this reason, internal EGR can be utilized to the limit of the occurrence of knocking. Because the transitional range is set within such a range that internal EGR is higher in fuel consumption rate than external EGR, fuel consumption can be improved.

If the VVT is thus controlled without delay, EGR amount transitionally decreases. This may cause an increase in fresh air amount and torque fluctuations. In order to suppress such torque fluctuations, it is appropriate to perform at least one of retardation of ignition timing and reduction of intake air amount if the occurrence of knocking is detected. Reduction of intake air amount can be realized, for example, by narrowing down the throttle valve disposed in an intake system.

If the VVT is arranged such that timings for opening and closing the intake valve can be adjusted, the VVT can enhance volumetric efficiency of intake air and increase output by advancing the timing for closing the intake valve. In a predetermined high-torque range set on the high-torque side with respect to the external EGR range, therefore, high-torque control for advancing timings for opening and closing the intake valve may be adopted. In the case where this high-torque control is adopted, if a torque in the high-torque range is requested during operation in the internal EGR range, it is preferable to maintain a state mainly based on internal EGR even in the external EGR range, which is located between the high-torque range and the internal EGR range. As a rule, an increase in overlap amount is equivalent to advancement of the timing for closing the intake valve. Even in the external EGR range, therefore, a transition to the high-torque range can be made without delay by maintaining the state in the internal EGR range.

In the case where this control is adopted, it is appropriate to increase open duty of the recirculation mechanism in the external EGR range with overlap amount having been increased. Alternatively, it is also appropriate to abolish external EGR itself. From the standpoint of suppressing fluctuations in EGR amount and torque fluctuations, the latter is preferred.

Although the embodiments of the invention have been described above, it is obvious that the invention is not limited to those embodiments and that various arrangements can be adopted unless they depart from the spirit of the invention. For example, the above-mentioned control processings may be realized not only software-wise but also hardware-wise.

In performing control of the first or second embodiment described above, control for the first or second arrangement described above may be performed separately. Alternatively, control for the first arrangement and control for the second arrangement may be performed in combination. Namely, it is also appropriate that the transitional range be provided in the internal EGR range of the EGR map 12 illustrated in the first embodiment and that switching to external EGR be performed depending on whether knocking has occurred or not. Further, control of the first embodiment and control of the second embodiment may be selectively performed on the basis of warm-up states, environmental factors, and the like of the engine. Further, some of the above-mentioned features may be combined with one another or may be nullified. More specifically, the invention can be arranged as a control device for performing various control operations as described above or an internal combustion engine equipped with the control device. The invention may also be arranged as a method of controlling an internal combustion engine.

In the embodiments illustrated above, the control unit detects an operational state of the internal combustion engine using engine speed and engine torque as parameters, and modifies the basic control regulations for switching between internal EGR and external EGR depending on the occurrence of knocking or the like. It is not absolutely required that the basic control regulations adopt engine speed and engine torque as parameters. For example, it is possible to use various parameters indicating operational state of the internal combustion engine directly or indirectly, including accelerator opening, vehicle speed, and the like.

What is claimed is:

1. A control device that controls operation of an internal combustion engine, comprising:
   a variable valve timing mechanism capable of adjusting a period of overlap during which both intake and exhaust valves are open;
   a recirculation mechanism that recirculates part of exhaust gas to the intake side;
   an operational state detecting portion that detects operational state of the internal combustion engine;
   a recirculation control portion that controls, on the basis of control regulations that are set in advance in accordance with an operational state of the internal combustion engine, an amount of internal exhaust gas recirculation based on the overlap and an amount of external exhaust gas recirculation based on the recirculation mechanism; and
   a regulation modifying portion that modifies the control regulations so as to avoid knocking if the occurrence thereof is forecast or detected during operation of the recirculation control portion.

2. The control device according to claim 1, further comprising:
   an ignition timing control portion that retards ignition timing of the internal combustion engine when knocking occurs.

3. The control device according to claim 1, further comprising:
   a high-torque control portion that advances timings for opening and closing the intake valve in a high-torque range that is provided on the high-torque side with respect to the external exhaust gas recirculation range, wherein
      the variable valve timing mechanism is at least capable of adjusting timings for opening and closing the intake valves, and
      the recirculation control portion maintains, even in the external exhaust gas recirculation range, a state in which internal exhaust gas recirculation is mainly carried out, if a torque in the high-torque range is requested during operation in the internal exhaust gas recirculation range.

4. The control device according to claim 1, wherein
   the regulation modifying portion shifts a boundary between a range in which internal exhaust gas recirculation is mainly carried out and a range in which external exhaust gas recirculation is mainly carried out to the low-torque side if the occurrence of knocking is forecast.

5. The control device according to claim 4, wherein
the boundary is set on the basis of a relationship between fuel consumption rate and torque of the internal combustion engine.

6. The control device according to claim 1, wherein
the regulation modifying portion modifies the control regulations such that external exhaust gas recirculation is mainly carried out when the internal combustion engine is in an operational state in which knocking is detected, if the knocking is detected during operation in an internal exhaust gas recirculation range that is set in the control regulations such that internal exhaust gas recirculation is mainly carried out.

7. The control device according to claim 6, wherein
a variable control regulation range that allows a switching operation to be performed such that external exhaust gas recirculation is carried out is provided within a predetermined range on the high-torque side in the internal exhaust gas recirculation range, and
the regulation modifying portion modifies the control regulations if knocking is detected during operation in the variable control regulation range.

8. The control device according to claim 1, wherein
the regulation modifying portion modifies the control regulations on the basis of a predetermined parameter relevant to the occurrence of knocking.

9. The control device according to claim 8, wherein
the predetermined parameter is at least one of temperature, pressure, humidity of air sucked into the internal combustion engine.

10. The control device according to claim 8, wherein
the predetermined parameter is temperature of the internal combustion engine.

11. The control device according to claim 10, wherein
a determination on temperature of the internal combustion engine is made on the basis of at least one of circulating oil temperature, catalyst temperature, and exhaust gas temperature of the internal combustion engine.

12. The control device according to claim 1, further comprising:
a transition control portion that performs control of the variable valve timing mechanism with a period of delay from control of the recirculation mechanism in at least one of a transition from the internal exhaust gas recirculation range in which internal exhaust gas recirculation is mainly carried out to an external exhaust gas recirculation range in which external exhaust gas recirculation is mainly carried out and a transition from the external exhaust gas recirculation range to the internal exhaust gas recirculation range.

13. The control device according to claim 12, wherein
the period of delay is set such that total amount of exhaust gas recirculated to the internal combustion engine becomes substantially constant.

14. The control device according to claim 12, wherein
the period of delay ranges from activation of the recirculation mechanism to confirmation of a drop in flow rate of external exhaust gas recirculation in the case of a transition from the external exhaust gas recirculation range to the internal exhaust gas recirculation range.

15. The control device according to claim 12, further comprising:
a knocking detecting portion that detects the occurrence of knocking,
wherein
the transition control portion reduces or eliminates the period of delay if the occurrence of knocking is detected.

16. The control device according to claim 15, wherein
the transition control portion further performs at least one of retardation of ignition timing and reduction of intake air amount if the occurrence of knocking is detected.

17. The control device according to claim 16, wherein
retardation control of ignition timing and reduction control of intake air amount are performed on the basis of either open-loop control or feedback control.

18. The control device according to claim 16, wherein
the control regulations are set on the basis of a relationship between speed and torque of the internal combustion engine.

19. A control device that controls operation of an internal combustion engine, comprising:
a variable valve timing mechanism capable of adjusting a period of overlap during which both intake and exhaust valves are open;
a recirculation mechanism that recirculates part of exhaust gas to the intake side;
an operational state detecting portion that detects operational state of the internal combustion engine;
a recirculation control portion that controls, on the basis of control regulations that are set in advance in accordance with an operational state of the internal combustion engine, an amount of internal exhaust gas recirculation based on the overlap and an amount of external exhaust gas recirculation based on the recirculation mechanism; and
a transition control portion that performs control of the variable valve timing mechanism with a period of delay from control of the recirculation mechanism in at least one of a transition from the internal exhaust gas recirculation range in which internal exhaust gas recirculation is mainly carried out to an external exhaust gas recirculation range in which external exhaust gas recirculation is mainly carried out and a transition from the external exhaust gas recirculation range to the internal exhaust gas recirculation range.

20. The control device according to claim 19, wherein
the period of delay is set such that total amount of exhaust gas recirculated to the internal combustion engine becomes substantially constant.

21. The control device according to claim 19, wherein
the period of delay ranges from activation of the recirculation mechanism to confirmation of a drop in flow rate of external exhaust gas recirculation in the case of a transition from the external exhaust gas recirculation range to the internal exhaust gas recirculation range.

22. The control device according to claim 19, further comprising:
a high-torque control portion that advances timings for opening and closing the intake valve in a high-torque range that is provided on the high-torque side with respect to the external exhaust gas recirculation range,
wherein
the variable valve timing mechanism is at least capable of adjusting timings for opening and closing the intake valves, and
the recirculation control portion maintains, even in the external exhaust gas recirculation range, a state in which internal exhaust gas recirculation is mainly carried out, if a torque in the high-torque range is requested during operation in the internal exhaust gas recirculation range.

23. The control device according to claim 19, wherein
the control regulations are set on the basis of a relationship between speed and torque of the internal combustion engine.

24. The control device according to claim 19, further comprising:
a knocking detecting portion that detects the occurrence of knocking,
wherein
the transition control portion reduces or eliminates the period of delay if the occurrence of knocking is detected.

25. The control device according to claim 24, wherein
the transition control portion further performs at least one of retardation of ignition timing and reduction of intake air amount if the occurrence of knocking is detected.

26. The control device according to claim 25, wherein
retardation control of ignition timing and reduction control of intake air amount are performed on the basis of either open-loop control or feedback control.

27. A method of controlling operation of an internal combustion engine including a variable valve timing mechanism capable of adjusting a period of overlap during which both intake and exhaust valves are open and a recirculation mechanism that recirculates part of exhaust gas to the intake side, comprising:
a detecting operational state of the internal combustion engine;
a controlling, on the basis of control regulations that are set in advance in accordance with an operational state of the internal combustion engine, an amount of internal exhaust gas recirculation based on the overlap and an amount of external exhaust gas recirculation based on the recirculation mechanism; and
a modifying the control regulations so as to avoid knocking if the occurrence thereof is forecast or detected during operation of the recirculation control portion.

28. The method according to claim 27, wherein
ignition timing of the internal combustion engine is retarded when knocking occurs.

29. The method according to claim 27, wherein
a boundary between a range in which internal exhaust gas recirculation is mainly carried out and a range in which external exhaust gas recirculation is mainly carried out is shifted to the low-torque side if the occurrence of knocking is forecast.

30. The method according to claim 29, wherein
the boundary is set on the basis of a relationship between fuel consumption rate and torque of the internal combustion engine.

31. The method according to claim 27, wherein
the control regulations are modified such that external exhaust gas recirculation is mainly carried out when the internal combustion engine is in an operational state in which knocking is detected, if the knocking is detected during operation in an internal exhaust gas recirculation range that is set in the control regulations such that internal exhaust gas recirculation is mainly carried out.

32. The method according to claim 31, wherein
a variable control regulation range that allows a switching operation to be performed such that external exhaust gas recirculation is carried out is provided within a predetermined range on the high-torque side in the internal exhaust gas recirculation range, and
the control regulations are modified if knocking is detected during operation in the variable control regulation range.

33. The method according to claim 27, wherein
the control regulations are modified on the basis of a predetermined parameter relevant to the occurrence of knocking.

34. The method according to claim 33, wherein
the predetermined parameter is at least one of temperature, pressure, humidity of air sucked into the internal combustion engine.

35. The method according to claim 33, wherein
the predetermined parameter is temperature of the internal combustion engine.

36. The method according to claim 35, wherein
a determination on temperature of the internal combustion engine is made on the basis of at least one of circulating oil temperature, catalyst temperature, and exhaust gas temperature of the internal combustion engine.

37. A method of controlling operation of an internal combustion engine including a variable valve timing mechanism capable of adjusting a period of overlap during which both intake and exhaust valves are open and a recirculation mechanism that recirculates part of exhaust gas to the intake side, comprising:
a detecting operational state of the internal combustion engine;
a controlling, on the basis of control regulations that are set in advance in accordance with an operational state of the internal combustion engine, an amount of internal exhaust gas recirculation based on the overlap and an amount of external exhaust gas recirculation based on the recirculation mechanism; and
a performing control of the variable valve timing mechanism with a period of delay from control of the recirculation mechanism in at least one of a transition from the internal exhaust gas recirculation range in which internal exhaust gas recirculation is mainly carried out to an external exhaust gas recirculation range in which external exhaust gas recirculation is mainly carried out and a transition from the external exhaust gas recirculation range to the internal exhaust gas recirculation range.

38. The method according to claim 37, wherein
the period of delay is set such that total amount of exhaust gas recirculated to the internal combustion engine becomes substantially constant.

39. The method according to claim 37, wherein
the period of delay ranges from activation of the recirculation mechanism to confirmation of a drop in flow rate of external exhaust gas recirculation in the case of a transition from the external exhaust gas recirculation range to the internal exhaust gas recirculation range.

40. The method according to claim 37, wherein
a state in which internal exhaust gas recirculation is mainly carried out is maintained even in the external exhaust gas recirculation range, if a torque in the high-torque range is requested during operation in the internal exhaust gas recirculation range.

41. The method according to claim 37, wherein
the control regulations are set on the basis of a relationship between speed and torque of the internal combustion engine.

42. The method according to claim 37, wherein
the period of delay is reduced or eliminated if the occurrence of knocking is detected.

43. The method according to claim 42, wherein
at least one of retardation of ignition timing and reduction of intake air amount is further performed if the occurrence of knocking is detected.

44. The method according to claim 43, wherein
retardation control of ignition timing and reduction control of intake air amount are performed on the basis of either open-loop control or feedback control.

* * * * *